United States Patent [19]

Ciprios et al.

[11] Patent Number: 4,596,283

[45] Date of Patent: Jun. 24, 1986

[54] PROCESS FOR MAGNETICALLY STABILIZING CONTACTOR COLUMNS CONTAINING IMMISCIBLE FLUIDS

[75] Inventors: George Ciprios, Pittstown; Ronald E. Rosensweig, Summit, both of N.J.

[73] Assignee: Exxon Research and Engineering Co., Florham Park, N.J.

[21] Appl. No.: 737,242

[22] Filed: May 23, 1985

[51] Int. Cl.[4] ............................................. F28C 3/00
[52] U.S. Cl. ..................................... 165/1; 165/111; 210/695; 261/122; 261/DIG. 80
[58] Field of Search ............................ 165/1, 96, 111; 261/DIG. 80, 122, 124; 210/695

[56] References Cited

U.S. PATENT DOCUMENTS

| | | | |
|---|---|---|---|
| 2,011,186 | 8/1935 | Van Dijck | 23/270 |
| 2,364,892 | 12/1944 | Elgin | 23/310 |
| 2,493,265 | 1/1950 | Scheibel | 23/270.5 |
| 2,601,674 | 6/1952 | Reman | 23/270.5 |
| 2,850,362 | 9/1958 | Scheibel | 23/270.5 |
| 3,325,255 | 6/1967 | Treybal | 23/270.5 |
| 3,635,819 | 1/1972 | Kaiser | 210/695 X |
| 3,767,571 | 10/1973 | Lorenc et al. | 210/695 X |
| 4,283,199 | 8/1981 | Szabo | 422/256 X |
| 4,539,040 | 9/1985 | Mawardi | 210/695 X |

OTHER PUBLICATIONS

R. E. Treybal, Mass Transfer Operations, 2nd ed., McGraw-Hill, 1968, pp. 409–431.
*Chemical Engineer's Handbook*, 5th ed., Perry and Chilton, McGraw-Hill, (1973), Continuous (Differential) Contact Equipment, pp. 21-17 thru 21-29.
Unit Operations of Chemical Engineering, 3rd ed., McCabe and Smith, McGraw-Hill, 1976, pp. 622–623, Flooding Velocities in Packed Towers.
AIChE Jour., vol. 13, No. 3, pp. 448–449, Flooding, May 1967.
Lapidus and Elgin, AIChE Journal, Mechanics of Vertical-Moving Fluidized Systems, vol. 3, No. 1, pp. 63–68, Mar. 1957.
Kehat et al., *British Chemical Engineering*, vol. 14, No. 6, pp. 803–805, The Design of a Spray Column Heat Exchanger, Jun. 1969.
Letan et al., *AIChE Journal*, vol. 14, No. 3, pp. 398–405, The Mechanism of Heat Transfer in a Spray Column Heat Exchanger, May 1968.
Letan et al., AIChE Journal, vol. 16, No. 6, pp. 955–963, The Mechanism of Heat Transfer in a Spray Column Heat Exchanger, Nov. 1970.
Blanding et al., *Transactions of the AIChE*, vol. 38, pp. 305–338 (1942), Limiting Flow in Liquid–Liquid Extraction Columns.
Lackme, *AIChE Symposium*, Scr. 70, (130) (1974), Two Regimes of a Spray Column in Countercurrent Flow, pp. 57–63.
Greskovich et al., *AIChE Journal*, vol. 13, (1967), Heat Transfer in Liquid–Liquid Spray Towers, pp. 1160–1166.
H. C. Hayworth, Chemtech, Jun. 1981, pp. 342–346, A Case in Technology Transfer.

*Primary Examiner*—Sheldon J. Richter
*Attorney, Agent, or Firm*—E. Thomas Wheelock

[57] ABSTRACT

This invention relates to a process for magnetically stabilizing the operation of contactor columns containing immiscible fluids passing in dispersed countercurrent flow. The process operates by including, in an appropriate fluid phase, a magnetizable component in an amount which does not substantially change the nature of the liquid in that phase and, further, imposing upon at least a portion of the column containing dispersed phases, a magnetic field sufficient to result in substantially diminished radial mixing of the phase containing the magnetizable substance and diminished coalescence of the dispersed phase. The phase containing the magnetizable component passes through the stabilized zone in substantial plug flow.

14 Claims, 1 Drawing Figure

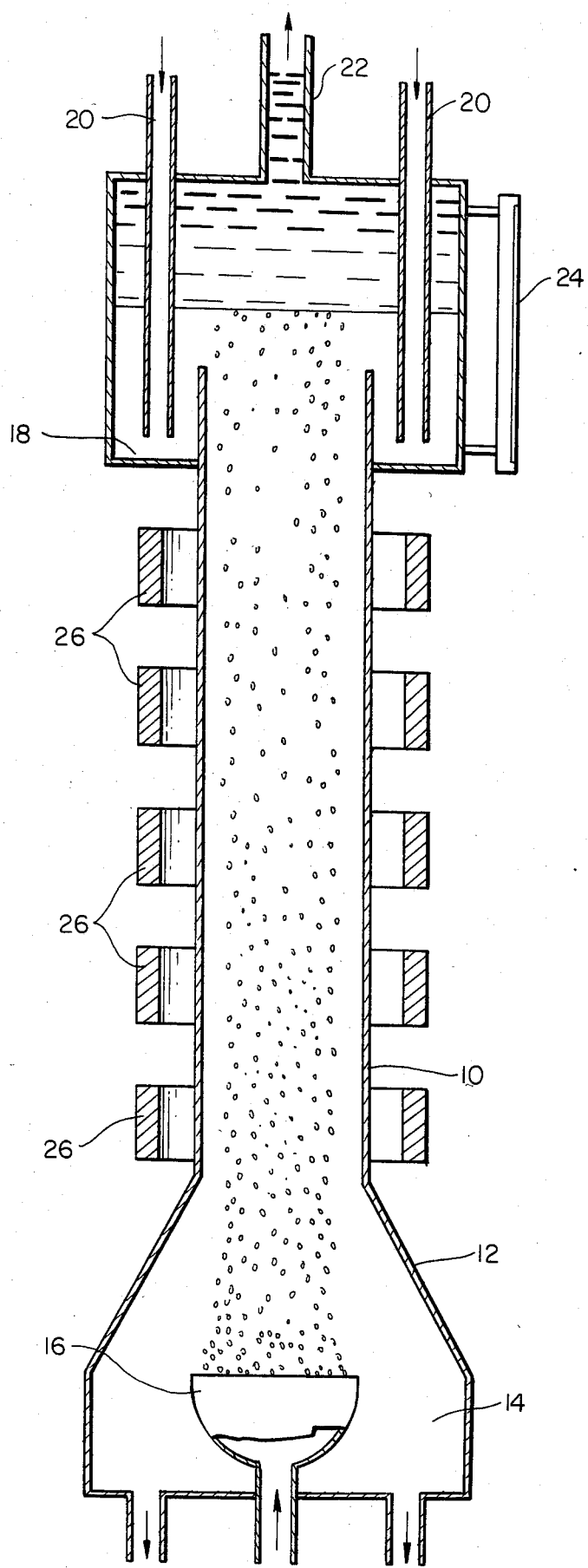

PROCESS FOR MAGNETICALLY STABILIZING CONTACTOR COLUMNS CONTAINING IMMISCIBLE FLUIDS

FIELD OF THE INVENTION

This invention relates to a process for magnetically stabilizing the operation of contactor columns containing immiscible fluids passing in dispersed flow. The process operates by including, in an appropriate fluid phase, a magnetizable component in an amount which does not substantially change the nature of the liquid in that phase and, further, by imposing upon at least a portion of the column containing those dispersed phases, a magnetic field sufficient to result in substantially diminished radial and axial mixing of the phases. The phases pass through the stabilized zone in substantial plug flow.

This process may be used in gas-liquid contacting processes where the liquid contains the magnetizable component. This contacting may entail mass or heat transfer in or out of the liquid phase. Chemical reactions may also take place. The liquid or the gas may be either the continuous or dispersed phase.

This process may also be used in liquid-liquid contacting processes and may entail mass or heat transfer in or out of either phase. Chemical reactions are permissible. Phase change from liquid to gas or liquid to solid is permitted when the liquid phase which is free of magnetizable components, is the dispersed phase.

BACKGROUND OF THE INVENTION

There are a large number of processes in which two or more nonmiscible fluids are contacted in a countercurrent fashion to exchange mass, momentum, or heat between the various phases.

Transfer of mass between the phases often involves a technique, often called liquid or solvent extraction, which depends on the selective dissolution of one or more components of the solution into a suitable immiscible solvent. The process is particularly useful when separating mixtures which are difficult to separate using physical methods, e.g., distillation, because the vapor pressures or other physical parameters of the components are too close.

The petroleum refining industry is potentially the largest identifiable user of extraction processes. In refining, most lubricating oil feedstocks are extracted to remove the less-useful aromatic compounds from the desired paraffinic and naphthenic hydrocarbons. Liquid propane is also used to separate desirable oils from the less beneficial asphaltenes. Kerosene is treated using various caustic solutions to remove the bulk of the included sulfur compounds.

Other chemical industries also use this type of liquid extraction. Virtually all vegetable oils are separated into edible and inedible portions using liquid propane as the extractant. Most uranium is extracted from its liquid lixiviant with tributyl phosphate in the process to concentrate it into a condensed and useful form.

In addition to the attainment of mass transfer, direct countercurrent liquid (or gas) -liquid contact is used to promote heat transfer from one phase to another. For instance, variously in Kehat et al, *British Chemical Engineering*, Vol. 14, No. 6, pgs. 803–805; Letan et al, *AIChE Journal*, Vol. 14, No. 3, pp 398–405; and Letan et al, *AIChE Journal*, Vol. 16, No. 6, pp. 955–963, the design of direct heat exchangers, i.e., those having no solid surface between hot and cold fluids, is discussed at length.

The equipment used to bring about direct contact of one fluid with the other typically utilize internal components which bring about intimate contact between the liquids with a high degree of turbulence. The rate of mass or heat transfer between the fluids depends to a large extent upon the contact area between the fluids. The extractor disperses one of the fluids in the other to produce a large surface area and relative motion to produce turbulence. The equipment usually provides for the subsequent mechanical separation of the dispersion based upon the different densities of the fluids. In a solvent extractor, the two streams are conventionally known as the raffinate, i.e., the stream remaining after the extraction is performed, and the extract, i.e., the solvent containing the extracted constituents.

Specifically, several widely used fluid contacting devices are the mixer-settler, the packed-column, the perforated tray tower, rotary-disc contactor, York-Scheibel column, Treybal extractor, and pulsed column.

In the mixer settler, the two liquids flow through a mechanically stirred box. The intimate mixture then flows to a settler having low relative velocity so that the two phases will be allowed to coalesce and separate. Upper and lower phases may then be recovered.

The packed-tower equipment is made up of a generally hollow vertical tower having a support grid in the lower end, an upper liquid distributor and a lower fluid (light liquid or gas) distributor. The region above the support grid is filled with a packing material such as rings or saddles.

The perforated-tray tower is also a vertical vessel containing a number of trays having small perforation therein and, on each tray, a sort of upside down weir to collect and coalesce the light fluid as it travels from the next lower plate. The light fluid is alternately dispersed and coalesced as it traverses up the tower. For additional discussion of the above devices, *See*, e.g., R. E. Treybal, Mass Transfer Operations, 2nd ed., McGraw-Hill, 1968.

Rotary-disc contactors are discussed at length in U.S. Pat. No. 2,601,674. The contactor is a tower formed into compartments by horizontal annular baffles. Within each compartment is a rotating, centrally located, horizontal disc to provide agitation. The diameter of the disc is generally smaller than the diameter of the annular hole. The contactor is virtually always used in countercurrent flow.

The York-Scheibel column is of two similar designs, as found in U.S. Pat. Nos. 2,493,265 and 2,850,362. The earlier model utilized alternating chambers in a tower so that each open chamber containing a centrally located impeller is vertically adjacent to two chambers filled with open weave wire mesh packing. The later design includes a pair of stationary annular shroud baffles surrounding each moving impeller. Again, these are typically operated in countercurrent flow.

The Treybal extractor, found in U.S. Pat. No. 3,325,255, is described in *Chemical Engineer's Handbook*, 5th Ed., Perry and Chilton McGraw-Hill (1973), as an adaption of a mixer-settler cascade extractor to column form wherein the liquids are permitted to settle completely between extraction stages.

Finally, a pulsed column is an extractor in which a relatively short amplitude oscillation is applied to the liquid contents. The principle has been attributed to van Dijck, as shwon in U.S. Pat. No. 2,011,186. The tower itself is usually a packed column or the perforated tower collumn discussed above.

Another countercurrent fluid contacting device which has received only moderate attention is the so-called spray tower. This device is essentially an open vertical tower with a light fluid distributor located in the bottom of the tower. Possibly the most well known version of this tower design is the socalled Elgin tower shown in Blanding et al, Transactions of the AIChE, Vol. 38, pp. 305–338 (1942) and U.S. Pat. No. 2,364,892 to Elgin, issued Dec. 12, 1944. However, the obvious benefit to the design is that the liquid throughput rate can be far greater than similarly sized devices such as those discussed above. The lack of any internal structure in the portion of the device above the lower distributor allows the continuous phase to undergo significant axial mixing. Consequently, the heat or mass transfer rates generally are low because of the lack of true countercurrent temperature or concentration differences.

The benefits of using a spray tower are significant enough that considerable work has been done in attempting to enhance the efficiency of these devices. For instance, the articles mentioned above, i.e., Kehat et al in British Chemical Engineering and the two Letan et al in AIChE Journal, discuss at length the design of spray column heat exchangers and the mechanism of heat transfer therein. The relative volume, or "hold-up", of the dispersed phase within the column proper is an important feature of the column design and operation. The effectiveness of the column as a heat exchange device or as an extraction device depends, as noted above, on the maintenance of a stable droplet dispersion with high interfacial area for transfer of heat or mass between disperse and continuous phases.

Several discrete hold-up phenomena occur as the flow rate of the dispersed phase is increased:

First, a dispersed packing mode is observed characterized by a low dispersed phase hold-up of about 0–40 volume percent. This conditions is easily obtained and yields a swirling motion of droplets rising within the column.

Second, as the dispersed phase flow is increased and the coalesced zone of droplets is maintained at the top of the column, a dense packing of dispersed phase droplets builds up at the top and works its way down the column. This is a condition of high hold-up, with values ranging from 50 to 80 volume percent (depending, of course, upon the fluids utilized). The maximum theoretical hold-up obtained via close packing of undeformed uniform sized spheres is about 75 volume percent. However, the presence of smaller drops within the interstitial zones of larger droplets and the existence of distorted drops can yield holdups as high as 90 volume percent.

Finally, as the dispersed phase flow rate increases even further, flooding occurs. The concept of "flooding" is discussed in Unit Operations of Chemical Engineering, 3rd Ed., McCabe & Smith, McGraw-Hill (1976), p. 622 in the following manner: "If the flow rate of either the dispersed phase or the continuous phase is held constant and that of the other phase gradually increased, a point is reached where the dispersed phase coalesces, the holdup increases, and finally both phases leave together through the continuous-phase outlet." A selection of definitions for visual flooding is also offered in AIChE Jour., Vol. 13, No. 3, p. 448. The latter paper suggests that the McCabe & Smith definition is perhaps a more sensitive measure of the maximum effective capacity of a device.

Blanding et al, Elgin, both Letan et al articles and Kehat et al discuss the desirability of obtaining dense packing in the column. Similarly, Lackme, AIChE Symposium, Scr. 70, (130) 57 (1974), and Greskovich et al, AIChE Journal, Vol. 13, 1160 (1967) cite the improved results that are achievable when dense packing is utilized.

In sum, the bulk of the literature data associated with studies of low holdup packing operation in spray-type fluid contactors show overall poor contacting. Axial dispersion effectively increases rapidly as column diameter increases beyond 6 inches to the industrially significant range of 36–40 inches. Efficient heat transfer, at least, cannot be achieved if low holdup column operation is permitted.

Thus, in the operation of a spray column as a direct heat exchanger, the dense packing mode is essential to successful column utilization. In the dense packing mode, wake shedding phenomena are damped out and gross backflow of the continuous phase is reduced substantially. However, even with this type of operation, there are problems. Both Letan et al and Kehat et al describe the potential inefficiencies of high hold-up or dense bed packing. In this case, they were studying a system where the disperse phase was less dense than the continuous phase. Narrow, irregular and asymmetric swarms of drops can be noted adjacent to the column walls, moving with higher velocity than the drops in the central core. This contributes to a characteristic, but oddly skewed, residence time distribution for the total array of drops within a column. Bypassing of asymmetric channels of the continuous phase down the column walls can also be observed. The noted articles by Letan and Kehat modeled the dense packed column flow in three sectors: an outer (annular) channel of dispersed phase drops moves up the column in plug flow, a thin downward flowing annular layer of continuous phase fluid is located between the outer layer of rising dispersed phase drops and an inner central core of rising dispersed phase drops. In this central core, the rising dispersed phase flows with a radial velocity profile.

Clearly, even in the studies designed to optimize the operation of a device such as this, the studies have not produced a broad and useful general means of obtaining operation without substantial backmixing. Clearly, nowhere is there shown the stabilization of such a column by introducing into the continuous or dispersed phase (as appropriate) a magnetizable component which does not change substantially the physical parameters (save magnetic and density parameter) of the innoculated liquid, and imposing on at least a portion of the column containing the fluids, a magnetic field of strength sufficient to prevent substantial backmixing.

SUMMARY OF THE INVENTION

As noted above, this invention relates to a process for magnetically stabilizing the operation of contactor columns containing immiscible fluids passing in dispersed cocurrent or countercurrent flow. The process operates by including, in an appropriate phase, a magnetizable component in an amount which does not substantially change the nature of the liquid in that phase and, further, imposing upon at least a portion of the column containing dispersed phases, a magnetic field sufficient to result in substantially diminished axial and radial mixing of the phases. All phases pass through the stabilized zone in substantial plug flow.

This process may be used in gas-liquid contacting processes where the liquid contains the magnetizable component. This contacting may entail mass and/or heat transfer in or out of the liquid phase. Chemical reactions may also take place. The liquid may be either the continuous or dispersed phase.

This process may also be used in liquid-liquid contacting processes and may entail mass and/or heat transfer in or out of either phase. Chemical reactions are permissible. Phase change from liquid to gas or liquid to solid is permitted when the liquid phase free of magnetizable components is the dispersed phase.

BRIEF DESCRIPTION OF THE DRAWINGS

FIG. 1 schematically depicts in side view an immiscible liquid spray column (ILSC) which is magnetically stabilized according to the invention disclosed herein.

DESCRIPTION OF THE PREFERRED EMBODIMENT

This invention relates to a method for magnetically stabilizing the relative movement of dispersed and continuous phases within a column, e.g., an ILSC, whether the holdup in that column is high or low. The method results in a substantial reduction of detrimental channelling and dispersion phenomena which have an adverse impact on conventional extractor behavior, even when operating in the dense packing mode. This stabilization method, when used as an ILSC, should permit ILSC scaleup to commercially significant column diameters, e.g., in excess of 24 inches, without seriously compromising interfluid contacting efficiency which is conventionally characterized as the height of an equilibrium theoretical plate (HETP) for mass transfer or the height of a transfer unit (HTU).

In the broadest sense, the invention consists of introducing a magnetizable component into the column and imposing a magnetic field on the column. The magnetic material may be introduced as an innoculant in the dispersed or continuous phase or as a third unrelated phase. Typical magnetic materials include, but are not limited to, ferrofluids, finely divided iron, 400 series stainless steel, magnetite, or alloys of nickel, cobalt, or iron. The magnetic material may be introduced in the form of microparticles, colloidal dispersions, or macroparticles. In certain instances, the magnetic innoculant may be introduced in the form of a soluble paramagnetic salt.

PRINCIPLES OF MAGNETIC STABILIZATION

Heretofore magnetic stabilization of two phase flow has been chiefly limited to:

A. Gas or liquid flow through a fluidized bed of magnetizable particles; and

B. Magnetizable liquid flow through a fluidized bed of non-magnetizable solid particles as disclosed in a copending application.

The present invention broadens the concepts of the systems to include:

C. Magnetizable liquid drops ascending or descending through a non-magnetic continuous liquid phase or descending through a non-magnetizable gas phase; and D. Non-magnetizable liquid drops ascending or descending or gas bubbles ascending through a magnetizable continuous liquid phase.

The magnetic stabilization of a type A or B system leads to the experimentally determined behavior of a three region "phase diagram" comprising fixed bed, stable bed, and bubbling bed regions. This theoretical prediction has been exemplified in Rosensweig, I/EC Fundamentals, supra, FIG. 6. The stable bed region at a given intensity of applied magnetic field extends from a fluid velocity of minimum fluidization to the transition velocity at which bed fluctuation motions appear.

Lapidus and Elgin (A.I.Ch.E. Journal, 1957, 3, 63) developed a unifying concept of engineering operations involving two-phase flows such as sedimentation, fluidization, conveying, aeration and continuous crystallization. All of these systems are characterized by the fact that there is viscous interaction between the two phases. The drag force exerted by the continuous fluid in a given system at a given concentration of the dispersed phase depends only on the relative velocity between the phases. With this insight, it was possible to interrelate the dispersed phase flow behavior in fluidized beds (no solids flow), cocurrent upflow systems, cocurrent downflow systems, and flooded systems (i.e., no flow of the continuous phase). The expansion curve of a fluidized bed may therefore be used to compute flow rates in a corresponding system in which both phases move.

Using the same procedure, it follows that knowledge of the stabilized bed operating velocity range for a given applied magnetic field intensity may be translated to operating conditions in the related systems. This concept extends to the relatively moving systems in C and D above.

THE INVENTIVE PROCESS

As noted above, the process operates by including, in an appropriate phase, an amount of a magnetizable substance which does not substantially change the nature of the liquid in that phase and, further, by imposing upon at least a portion of the column containing the dispersed phase, a magnetic field sufficient to result in substantially diminished axial and radial mixing in both the magnetizable and nonmagnetizable phases. The magnetic field should also be of sufficient strength to stabilize the flow of the dispersed phase in the absence of substantial coalescence and allow passage of the dispersed and continuous phases through the stabilized zone in substantially plug flow. The magnetizable substance is desirably in the nature of a ferrofluid. The ferrofluid is a stable colloidal dispersion of superparamagnetic particles having a diameter in the neighborhood of 0.01 microns. These dispersions have a tendency to retain their liquid properties in a magnetic field. By a proper choice of stabilizing agents, magnetic properties may be conferred to a wide range of liquids which include water, hydrocarbons and fluorocarbons.

Other materials such as finely divided iron, 400 series stainless steel, magnetite, or alloys of nickel, cobalt, or iron, may be introduced into the column with either phase or, indeed, with a third phase.

Details of producing ferrofluids or very small particles for inclusion in a liquid passing through a fluid-fluid contracting device are known in the art and form no part of this invention.

This process may be used in gas-liquid contacting devices where the liquid contains the magnetizable component and passes in countercurrent or cocurrent flow to the gas in a dispersed phase. This contacting may entail mass and/or heat transfer in or out of the liquid or gas phase. Chemical reactions may also take place. A liquid-solid phase change within the dispersed phase may also occur.

The process may also be used in a liquid-liquid contacting process which may entail mass or heat transfer in or out of either phase. Chemical reactions are also permissible. Phase change in the dispersed phase from liquid to gas or liquid to solid is permitted.

A specific form of adsorption which is particularly suited for inclusion in the instant inventive process involves the use of the so-called self-supported liquid membrane. The basic elements of the system are produced by making an emulsion of an aqueous reagent (internal phase), a specially selected oil containing an oil-soluble surfactant, and, if necessary, an ion carrier. The droplets of the internal aqueous phase in the emulsion are about $1\mu-10\mu$ in diameter. The oil continuous emulsion is then dispersed into a continuous aqueous phase in the form of discrete globules of emulsion that are about $100-2000\mu$ in diameter. The immiscible oil between the continuous aqueous phase and the internal aqueous phase is the liquid membrane. Functionally, the membrane exists only when the emulsion is dispersed in the continuous aqueous phase.

The liquid membrane process, as described by H. C. Hayworth in Chemtech, June, 1981, pp. 342-6, has many potential uses. For instance, inclusion of an acid in the internal liquid phase will allow the removal of basic oil-soluble materials, such as undissociated $NH_3$, from the continuous aqueous phase. Similarly, $H_2S$ may be scavenged by using a basic internal agent. Metallic ions may be scavenged by using a cation carrier, such as an aromatic oxine, in the oil membrane. Stabilization of liquid membrane processes is also possible using the present invention.

One particularly desirable method of using the inventive method of this invention is schematically depicted in FIG. 1. FIG. 1 shows the immiscible liquid spray column (ILSC) having means for magnetically stabilizing the mid-portion of the column. The column itself is much like that disclosed by Elgin in U.S. Pat. No. 2,364,892, supra, in that it has a central section 10 which provides a uniform contact zone. The inlet section is a conical section 12 provided by extending between the lower end of central section 10 and the settling chamber 14. The settling chamber 14 is of the same or slightly greater cross-section than the larger end of conical member 12. A discontinuous or dispersed liquid stream is introduced into the vessel through an inlet nozzle or distributor 16.

The outlet section of the column is provided by a chamber 18 having a substantially greater cross-sectional area than the central section 10. This upper chamber is provided with inlet conduits 20 for introducing the liquid which comprises the continuous phase. Inlet conduits 20 extend to the lower portion of the chamber 18. The chamber is provided with an outlet conduit 22 which is used for connecting the upper portion of the chamber to other downstream devices. The settling chamber may be provided with a sight-glass 24 to allow monitoring of the interface level in the chamber.

Elgin considered it particularly important, for the efficient operation of the column, that the inlet section 12 and distributor 16 be in particular critical locations. The distributor must be positioned in the expansion section 12 so as to provide an annular passage between the distributor and the walls of the section which is at least as large in a cross-sectional area as the contact section 10. This relationship ensures that the velocity of the continuous phase at no point exceeds its velocity in the contact zone. It is considered preferable that the velocity of the continuous phase at the level of introduction be 0.2 to 0.9 times the velocity in the central section 10.

Although this column is shown with the inlet nozzle 16 at the bottom of the column so as to disperse the light liquid, by merely upending the tower and placing the dispersion nozzle 16 in the upper end, the heavier fluid may be dispersed through a continuous light fluid.

In any event, the towers may be operated by introduction of heavy fluids through feed conduits 20 and the introduction of light fluid through inlet nozzle 16. The flow rates are controlled to produce a coalescence level in side glass 24. Typically the light fluid will be passed through the column at the highest flow rate permissible without producing flooding or carryover of the heavy fluid through outer conduit 22.

The column may be stabilized by introduction of a sufficient amount of, e.g., ferrofluid, either into the heavy fluid introduced in conduits 20 or into the light fluid introduced through inner nozzle 16. Clearly, if the dispersed phase density is greater than the continuous phase, the drops will descend. If that density is smaller, the drops will rise. Addition of the ferrofluid to either phase will affect the density of the respective phase and the resulting density will dictate which liquid goes in which end of the tower. Electromagnetic means 26 may be disposed about the tower and provide a magnetic field within the tower sufficient to prevent substantial axial and radial dispersion of the dispersed light phase and to lower coalescence of the dispersed phase within central section 10. The manner of determining optimal magnetic strength is described at various places within the Rosensweig literature described above. The process and apparatus shown in the figure may be used for any number of different extractions or chemical reactions. It may be used in a liquid membrane process, as was discussed above. It may also be used as a device for transferring heat from one phase to the other or for transferring momentum as in an ejector duct or MHD duct.

The column as described may be used to contact gas with liquids.

Stabilization of the tower in this manner offers several strong attractions. For instance, if used as a direct contact heat exchanger, the tower offers simplicity over the classical tube and shell heat exchanger; it offers low cost in that the mechanical design specifications can be less stringent and the construction can be much less expensive. The design offers high heat throughput per unit equipment volume, particularly when high interfacial areas can be attained. Since there is no heat transfer surface between the opposing fluids, there can be no scale deposition on those heat transfer surfaces resulting in lower heat transfer rates. The design provides a high heat flux even when the temperature differences between the two fluids are as low as one or two degrees Fahrenheit. The design can provide a close approach temperature between two fluids, ensuring efficient heat exchange.

If used as a crystallizing device, the column allows achievement of exceptionally slow cooling rates, if so desired, to control the morphology of the crystallizing phases.

These and other advantages will become apparent to one having ordinary skill in the art upon considering the above disclosure and the appended claims.

We claim as our invention:

1. A method for stabilizing a contacting zone wherein a first and a second fluid, which are substantially immiscible, are contacted in said zone, comprising the steps of:
   adding a sufficient amount of a magnetizable material to one of said first or second fluids;
   dispersing one of said fluids into the other;
   maintaining a magnetic field about at least a portion of the contacting zone, said magnetic field having sufficient strength to prevent substantial axial or radial mixing of the first or second fluid.

2. The process of claim 1 wherein the first fluid is a gas and the second fluid is a liquid, said liquid containing the magnetizable material.

3. The process of claim 1 wherein the first and second fluids are liquid.

4. The process of claim 1 wherein heat is transferred between first and second fluids.

5. The process of claim 1 wherein mass is transferred between said first and second fluids.

6. The process of claim 1 wherein a chemical reaction takes place within the contacting zone.

7. The process of claim 1 wherein the magnetizable material comprises a ferrofluid.

8. The process of claim 1 wherein the magnetizable material is added to one of said first or second fluids in the form of an added third phase.

9. The process of claim 1 wherein said first and second fluids flow cocurrently within the contacting zone.

10. The process of claim 9 wherein the dispersed phase is covered with a liquid membrane.

11. The process of claim 1 wherein said first and second fluids flow countercurrently within the contacting zone.

12. The process of claim 11 wherein the dispersed phase is covered with a liquid membrane.

13. The process of claim 1 wherein the magnetizable material comprises macroparticles.

14. The process of claim 13 wherein the macroparticles comprise finely divided iron, 400 series stainless steel, magnetite, nickel, cobalt or alloys of nickel, cobalt, or iron.

* * * * *